(12) United States Patent
Ishii et al.

(10) Patent No.: US 8,721,191 B2
(45) Date of Patent: May 13, 2014

(54) OPTICAL COMPONENT

(75) Inventors: Motohaya Ishii, Atsugi (JP); Takashi Yamada, Atsugi (JP); Yoshiyuki Doi, Atsugi (JP); Takashi Saida, Atsugi (JP); Ken Tsuzuki, Atsugi (JP); Takashi Goh, Atsugi (JP); Hiroshi Yamazaki, Atsugi (JP); Shinji Mino, Atsugi (JP); Takao Fukumitsu, Atsugi (JP); Atsushi Murasawa, Yokohama (JP); Fumihiro Ebisawa, Yokohama (JP); Hiroshi Terui, Yokohama (JP); Tomoyo Shibazaki, Yokohama (JP); Yuichi Kikuchi, Yokohama (JP)

(73) Assignees: Nippon Telegraph and Telephone Corporation, Tokyo (JP); NTT Electronics Corporation, Kanagawa (JP)

( * ) Notice: Subject to any disclaimer, the term of this patent is extended or adjusted under 35 U.S.C. 154(b) by 0 days.

(21) Appl. No.: 13/813,388

(22) PCT Filed: Aug. 2, 2011

(86) PCT No.: PCT/JP2011/004375
§ 371 (c)(1),
(2), (4) Date: Jan. 30, 2013

(87) PCT Pub. No.: WO2012/017644
PCT Pub. Date: Feb. 9, 2012

(65) Prior Publication Data
US 2013/0136393 A1 May 30, 2013

(30) Foreign Application Priority Data
Aug. 6, 2010 (JP) ................................ 2010-177979

(51) Int. Cl.
*G02B 6/36* (2006.01)

(52) U.S. Cl.
USPC ................................. 385/89; 385/88; 385/14

(58) Field of Classification Search
USPC .............................................. 385/88–92, 14
See application file for complete search history.

(56) References Cited

U.S. PATENT DOCUMENTS 6,993,220 B2 * 1/2006 Shinozaki et al. .............. 385/37

FOREIGN PATENT DOCUMENTS

JP H02-073207 3/1990
JP H07-013039 1/1995
(Continued)

OTHER PUBLICATIONS

Yamada et al., "Highly functional and high-speed modulators with PLC-LiNbO₃ direct attachment", IEICE Technical Report, Institute of Electronics, Information, and Communication Engineers, May 13, 2005, vol. 105, No. 71, pp. 1 to 6 (OPE2005-8), Japanese language reference with English language Abstract.

Yamada et al., "High Speed Optical Functional Modulators and Optical Switch Module Using Hybrid Assembly Technique with Silica-Based PLCs and LiNbO₃ Devices", IEICE Technical Report, Institute of Electronics, Information, and Communication Engineers, Jul. 20, 2007, vol. 107, No. 153, pp. 3 to 8 (OCS2007-21), Japanese language reference with English language Abstract.

(Continued)

*Primary Examiner* — Ellen Kim
(74) *Attorney, Agent, or Firm* — Workman Nydegger

(57) ABSTRACT

In an optical component configured to fix to a mount an optical device chip in which waveguide type optical devices having different thermal expansion coefficients are butt-jointed, deterioration in reliability due to thermal stress is suppressed. The optical component (300) comprises an optical device chip (310) including an LN waveguide (311), a first PLC waveguide (312), a second PLC waveguide (313), and a fiber alignment member (314), a mount (320), and optical fibers (330). Each of connection faces between the first PLC waveguide and the fiber alignment member is configured as an tilted structure, and each of connection faces between the LN waveguide, and the first and second PLC waveguides is configured as a right-angled structure. In the right-angled structure, the connection faces are connected by an adhesive having a lower Young's modulus than that of an adhesive used on the connection faces of the tilted structure.

5 Claims, 3 Drawing Sheets

(56) References Cited

FOREIGN PATENT DOCUMENTS

| JP | H07-209547 | 8/1995 |
|----|------------|--------|
| JP | 2001-343552 | 12/2001 |
| JP | 2003-121806 | 4/2003 |
| JP | 2006-323192 | 11/2006 |
| JP | 2009-204753 | 9/2009 |

OTHER PUBLICATIONS

PCT/JP2011/004375, Sep. 6, 2011, International Search Report.
International Preliminary Report dated Mar. 21, 2013, issued in PCT Application No. PCT/JP2011/004375, filed Aug. 2, 2011.

* cited by examiner

OPTICAL COMPONENT

CROSS REFERENCE TO RELATED APPLICATIONS

This application is a U.S. Nationalization of PCT Application Number PCT/JP2011/004375, filed on Aug. 2, 2011, which claims priority to Japanese Patent Application No. 2010-177979, filed on Aug. 6, 2010, the entireties of which are incorporated herein by reference.

TECHNICAL FIELD

The present invention relates to an optical component, and in more detail, to an optical component provided with a waveguide type optical device.

BACKGROUND ART

With the development of optical communication systems, the demand for highly-functional optical modules (optical components) increases. A waveguide type optical device can realize various kinds of lightwave circuits by forming waveguides on a substrate, which is used as an element of the optical module. For higher functionality of the optical module, a hybrid optical module, in which waveguide type optical devices having different functions are integrated, is realized. An example of a specific optical module includes an RZ-DQPSK (Return to Zero Differential Quadrature Phase Shift Keying) module and the like.

The RZ-DQPSK module has the structure, for example, that PLC (Planar Lightwave Circuit) waveguides each forming an optical waveguide on an Si substrate or a quarts substrate by silica-based glass and an LN waveguide forming optical waveguides on an LN (lithium niobate) substrate by using titanium diffusion are butt-jointed so as to be optically coupled, and the LN waveguide is fixed to amount (refer to FIG. 1A and FIG. 1B). In FIG. 1A and FIG. 1B (corresponding to FIG. 6 in Non-Patent Literature 1), the mount achieves a function of a package accommodating the PLC waveguides, the LN waveguide, and a fiber alignment member. Optical fibers are aligned to the fiber alignment member and are butt-jointed thereto to be optically coupled with the PLC waveguide. Connection interfaces between the fiber alignment member and the PLC waveguide and between the PLC waveguide and the LN waveguide are respectively fixed by an adhesive. In addition, the optical fibers are fixed to the mount in a position of penetrating through the mount by soldering or the like. In such a structure, as a temperature in the periphery of the optical module changes, a thermal strain is generated due to a difference in thermal expansion between the respective materials in each of the connection interfaces between the fiber alignment member and the PLC waveguide and between the PLC waveguide and the LN waveguide, which therefore causes the adhesive to be easily separated. Further, a difference in thermal expansion between each of the PLC waveguide and the LN waveguide, and the mount is generated, thus applying tension stress on the optical fiber. An increase in the tensile stress causes breakdown of the optical fiber. Even if a material of the mount (package) is made of stainless, for example, SUS303 to make a difference in thermal expansion coefficient from the LN smaller, a large difference in the thermal expansion coefficient exists between the PLC, the optical fiber or the like, and the package material. Table 1 shows values of the thermal expansion coefficient. For overcoming this problem, a soft adhesive for relaxation of the thermal stress is used in each of the connection interfaces between the fiber alignment member and the PLC waveguide and between the PLC waveguide and the LN waveguide to prevent the separation therein. In addition, as shown in FIG. 1B, there is adopted a method where the optical fiber is buckled to release the thermal stress to be applied on the optical fiber.

TABLE 1

| Name of Component | Thermal expansion coefficient ($\times 10^{-6}$/K) |
|---|---|
| SUS303 | 17.3 |
| LN | 15.4 |
| PLC | 2.5 |
| Optical fiber | 0.75 |

CITATION LIST

Non-Patent Literature

NPL 1: Technical report by Institute of Electronics, Information and Communication Engineers of 2005/May 20, Vol. 105, No. 71, pp. 1 to 6, OPE2005-8: High-speed modulator module using the connection of PLC and LN, by Takashi Yamada and Motohaya Ishii

SUMMARY OF INVENTION

The aforementioned structure has, however, still the problem. Each of the connection portions between the PLC waveguide and the fiber alignment member generally adopts the structure of preventing reflection by tilting an end face thereof. Therefore the buckling stress of the fiber is generated to cause a component in parallel to each of the connection faces between the PLC waveguide and the fiber alignment member where a soft adhesive is used, and the parallel component is the cause of an optical axis shift (refer to FIG. 2). Particularly in FIG. 2, $P_b$ is the buckling stress applied from the fiber to the fiber alignment member, and is expressed according to Formula (1).

[Formula 1]

$$Pb = \frac{4\pi^2 EI}{L^2}, I = \frac{\pi d^4}{64} \qquad (1)$$

where L is the fiber length, E is the Young's modulus, I is second moment of area (quantity expressing a degree in difficulty of deformation of an object to bending moment), and d is the diameter.

In the above description, the explanation is made of an example of the RZ-DQPSK module in which the PLC-LN chip configured by the PLC waveguides and the LN waveguide is fixed to the mount, but the similar problem takes place with respect to an optical device chip in which a plurality of waveguide type optical devices having different thermal expansion coefficients are butt-jointed.

The present invention is made in view of the foregoing problem, an object of the present invention is to suppress deterioration in reliability due to thermal stress in an optical component fixed to a mount, and the optical component comprises an optical device chip, in which a plurality of waveguide type optical devices having different thermal expansion coefficients are butt-jointed, and one or more optical fibers.

In order to achieve this object, an optical component according to a first aspect in the present invention, comprises an optical device chip including a first waveguide type optical device, a second waveguide type optical device which is butt-jointed to an end of the first waveguide type optical device to be optically coupled therewith and has a thermal expansion coefficient different from that of the first waveguide type optical device, and a fiber alignment member butt-jointed to the second waveguide type optical device to be optically coupled therewith, amount on which the optical device chip is mounted, and optical fibers aligned to the fiber alignment member and fixed in a buckled state, wherein each of connection faces between the second waveguide type optical device and the fiber alignment member is configured as a tilted structure, each of connection faces between the first waveguide type optical device and the second waveguide type optical device is configured as a right-angled structure, the adhesive used on the connection face of the tilted structure suppresses an optical axis shift on the connection face of the tilted structure due to buckling stress of the optical fiber, and the adhesive used on the connection face of the right-angled structure suppresses separation of adhesive faces between the first waveguide type optical device and the second waveguide type optical device due to thermal strain, a Young's modulus of an adhesive used on the connection face of the tilted structure is higher than that of an adhesive used on the connection face of the right-angled structure.

In addition, a second aspect of the present invention according to the first aspect is characterized in that the Young's modulus of the adhesive used on the connection face of the tilted structure is equal to or more than $1 \times 10^7$ Pa, and the Young's modulus of the adhesive used on the connection face of the right-angled structure is less than $1 \times 10^7$ Pa.

In addition, a third aspect of the present invention according to the second aspect is characterized in that a difference in thermal expansion coefficient between the second waveguide type optical device and the fiber alignment member is smaller than a difference in thermal expansion coefficient between the first waveguide type optical device and the second waveguide type optical device.

In addition, a fourth aspect of the present invention according to the second or third aspect is characterized in that a substrate of the first waveguide type optical device is made of lithium niobate, indium phosphorus or KIN, and a substrate of the second waveguide type optical device is made of quartz or silicon.

According to the present invention, in the optical component comprising the plurality of the waveguide type optical devices, and the optical fibers fixed in a buckled state using the fiber alignment member, each of the connection faces between the waveguide type optical device and the fiber alignment member is configured as the tilted structure, and each of the connection faces between the waveguide type optical devices each other is configured as the right-angled structure, wherein the Young's modulus of the adhesive used on the connection face of the tilted structure is higher than that of the adhesive used on the connection face of the right-angled structure, thereby making it possible to suppress deterioration in reliability due to thermal stress.

DESCRIPTION OF EMBODIMENTS

Hereinafter, an embodiment in the present invention will be in detail explained with reference to the drawings.

Figure 1A:
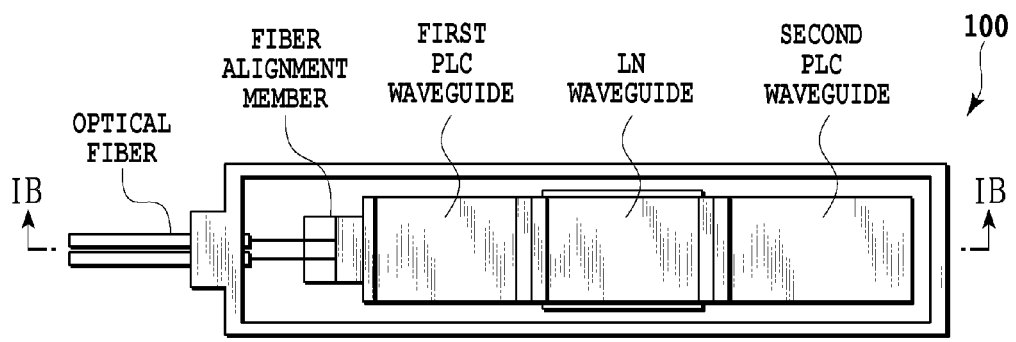
FIG. 1A is a top view of the conventional optical component.
Figure 3:
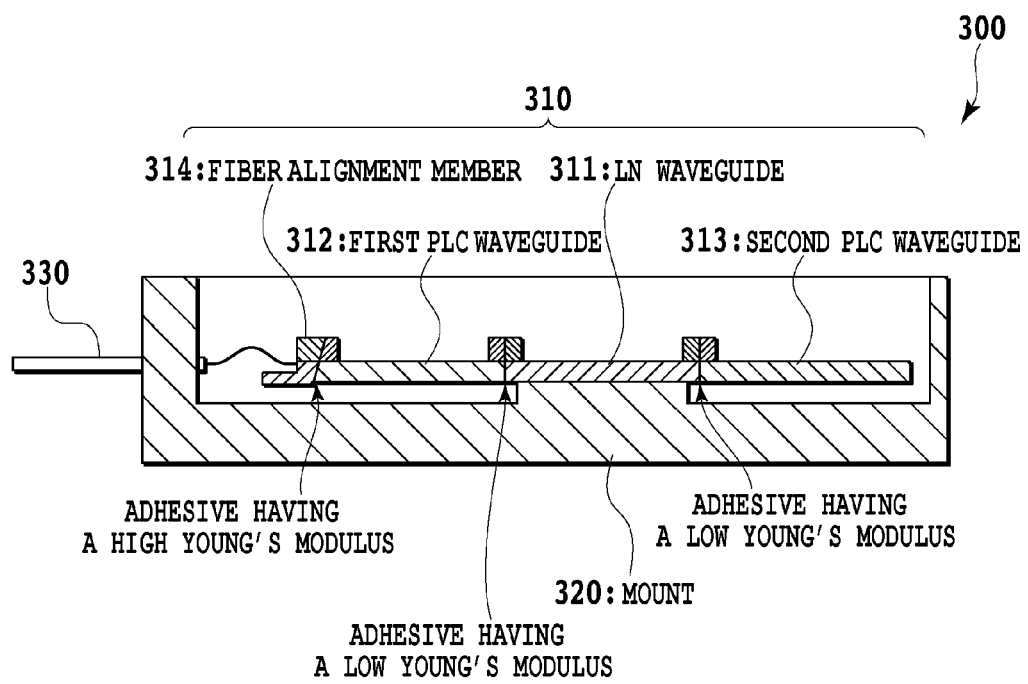
FIG. 3 is a diagram showing an optical component according to an embodiment in the present invention.

FIG. 3 shows an optical component according to an embodiment in the present invention. An optical component 300 is mostly similar to the optical component 100 in FIG. 1A and FIG. 1B, but differs in connection faces between PLC waveguides and an LN waveguide and in connection faces between the PLC waveguide and a fiber alignment member therefrom. The optical component 300 comprises an optical device chip 310 including an LN waveguide 311 (corresponding to a first waveguide type optical device), a first PLC waveguide 312 (corresponding to a second waveguide type optical device) butt-jointed to an end of the LN waveguide 311 to be optically-coupled therewith, a second PLC waveguide 313 butt-jointed to the other end of the LN waveguide 311 to be optically-coupled therewith, and a fiber alignment member 314 butt-jointed to the first PLC waveguide 312 to be optically-coupled therewith, amount 320 on which the optical device chip 310 is mounted, and optical fibers aligned to the fiber alignment member 314. In FIG. 3, the LN waveguide 311 is fixed to the mount 320, but the first and second waveguides 312 and 313 or the fiber alignment member 314 may be fixed thereto.

Figure 1B:
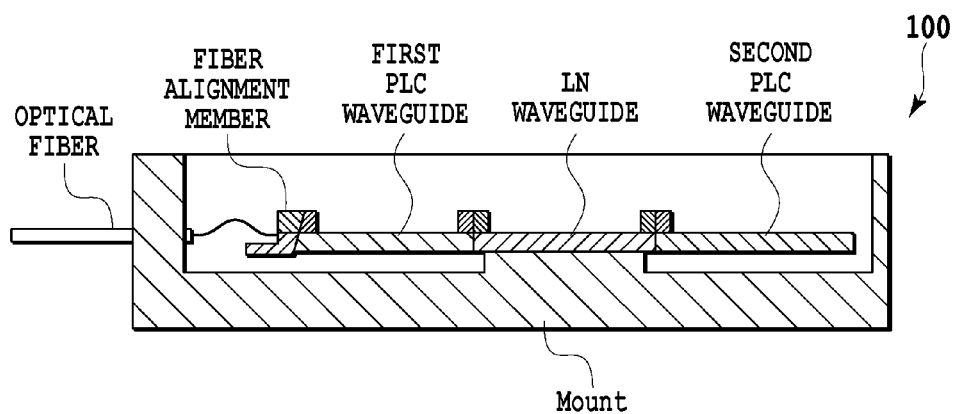
FIG. 1B is a cross section taken along line IB-IB of the conventional optical component.
Figure 2:
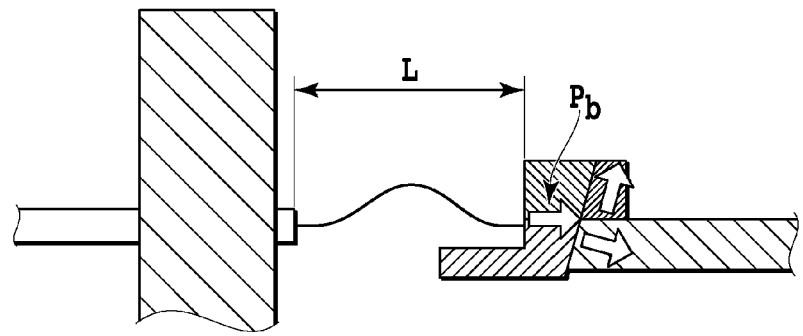
FIG. 2 is a diagram explaining a buckling weight of an optical fiber.

As similar to the case in FIG. 1B, a buckling weight Pb is generated due to buckling of the optical fiber 330, so that a weighted component exists in a direction in parallel to each of connection faces between the first PLC waveguide 312 and the fiber alignment member 314, that is, in a direction of causing an optical axis shift to the optical component 300. In the optical component 300 in the present embodiment, the optical axis shift is suppressed by connecting the connection faces by an adhesive having a high Young's modulus E (for example, $1 \times 10^7$ Pa or more). It is preferable that as the fiber alignment member 314, a material matched to a thermal expansion coefficient of the first PLC waveguide 312 is selected to prevent generation of a difference in thermal expansion coefficient between both sides of connection faces of both. For example, in a case where a substrate of the first PLC waveguide 312 is formed of Si, Pyrex (registered trademark) glass may be used in the fiber alignment member 314.

In the connection faces between the LN waveguide 311, and the first and second PLC waveguides 312 and 313, the connection face is configured as a right-angled structure at a right angle to the optical axis direction. Since each of the connection faces between the first PLC waveguide 312 and the fiber alignment member 314 is configured as the tilted structure, the force component in parallel to the connection face is generated, but the force component is eliminated by configuring the connection face as the right-angled structure. In this case, it is preferable that they are connected by an adhesive having a lower Young's modulus than that in the connection interface between the first PLC waveguide 312 and the fiber alignment member 314. The reason for it is that, since the LN waveguide 311 differs in thermal expansion coefficient from the first and second PLC waveguides 312 and 313, as an adhesive having a higher Young's modulus is used, there is a possibility that the adhesive faces are separated due to thermal strain. In other words, when the difference in thermal expansion coefficient exists between both the sides of the connection faces, it is preferable to use an adhesive having a lower Young's modulus as the difference becomes larger.

Figure 4:
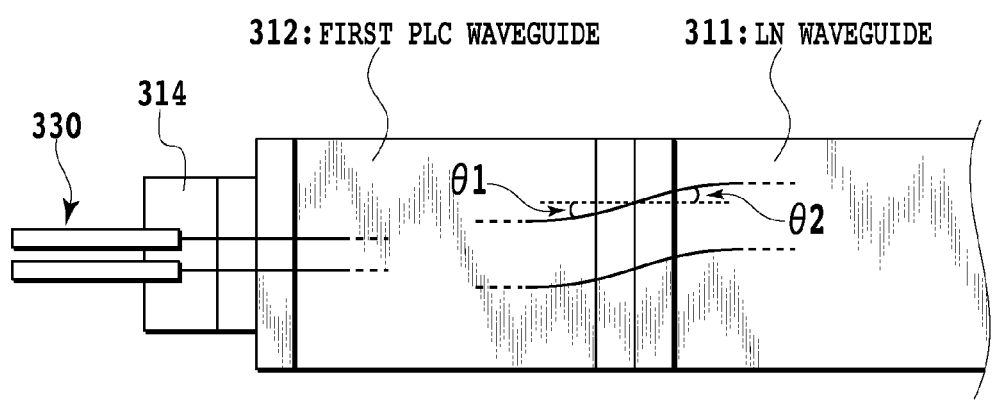
FIG. 4 is a diagram explaining an angle of an optical waveguide on connection faces between an LN waveguide and a PLC waveguide.

In general, there are some cases where each of the connection faces between the PLC waveguide and the LN waveguide is tilted for reflection prevention, but configuring the connection face as the right-angled structure as the present invention also enables the reflection prevention to be realized. Optical waveguides between the LN waveguide 311, and the first and second PLC waveguides 312 and 313 are only required to be designed to have a predetermined angle at the end face. The reflection prevention will be explained with reference to FIG. 4 by focusing attention on the boundary face between the first PLC waveguide 312 and the LN waveguide 311. (1) First, a first angle θ1 is determined in such a manner that Fresnel reflection R expressed according to Formula (2) is not coupled with the optical waveguide of the first PLC waveguide 312 as returning light. The first angle θ1 is an angle of the optical waveguide of the first PLC waveguide 312 to a normal line of the connection face, generally in a range from four degrees to twelve degrees.

[Formula 2]

$$R = \left(\frac{n_1 - n_2}{n_1 + n_2}\right)^2 \quad (2)$$

(2) Next, in a case where a refraction index of the first PLC waveguide 312 is different from that of the LN waveguide 311, a second angle θ2 is determined to meet Snell's law expressed according to Formula (3), wherein n1 and n2 respectively indicate refraction indexes of the first PLC waveguide 312 and the LN waveguide 311.

[Formula 3]

$$\frac{\sin\theta_1}{\sin\theta_2} = \frac{n_2}{n_1} \quad (3)$$

The angles θ1 and θ2 of the optical waveguide are determined by the above procedure, and thereby the reflection can be prevented even if the end face is formed of the right angle.

It should be noted that quartz or silicon may be used as the substrate of each of the first and second PLC waveguides 312 and 313. In addition, a waveguide type optical device formed on an indium phosphorus substrate or a KIN substrate may be used instead of the LN waveguide 311.

The invention claimed is:

1. An optical component comprising:
an optical device chip including a first waveguide type optical device, a second waveguide type optical device which is butt-jointed to an end of the first waveguide type optical device to be optically coupled therewith and has a thermal expansion coefficient different from that of the first waveguide type optical device, and a fiber alignment member butt-jointed to the second waveguide type optical device to be optically coupled therewith;
a mount on which the optical device chip is mounted; and
one or more optical fibers aligned to the fiber alignment member and fixed in a buckled state, wherein
each of connection faces between the second waveguide type optical device and the fiber alignment member is configured as a tilted structure,
each of connection faces between the first waveguide type optical device and the second waveguide type optical device is configured as a right-angled structure,
the adhesive used on the connection face of the tilted structure suppresses an optical axis shift on the connection face of the tilted structure due to buckling stress of the optical fiber,
the adhesive used on the connection face of the right-angled structure suppresses separation of adhesive faces between the first waveguide type optical device and the second waveguide type optical device due to thermal strain, and
a Young's modulus of an adhesive used on the connection face of the tilted structure is higher than that of an adhesive used on the connection face of the right-angled structure.

2. An optical component according to claim 1, wherein the Young's modulus of the adhesive used on the connection face of the tilted structure is equal to or more than $1 \times 10^7$ Pa, and the Young's modulus of the adhesive used on the connection face of the right-angled structure is less than $1 \times 10^7$ Pa.

3. An optical component according to claim 2, wherein a difference in thermal expansion coefficient between the second waveguide type optical device and the fiber alignment member is smaller than a difference in thermal expansion coefficient between the first waveguide type optical device and the second waveguide type optical device.

4. An optical component according to claim 2, wherein a substrate of the first waveguide type optical device is made of lithium niobate, indium phosphorus or KTN, and a substrate of the second waveguide type optical device is made of quartz or silicon.

5. An optical component according to claim 3, wherein a substrate of the first waveguide type optical device is made of lithium niobate, indium phosphorus or KTN, and a substrate of the second waveguide type optical device is made of quartz or silicon.

* * * * *